May 19, 1970     R. A. SPYRA     3,512,815

BALL-AND-SOCKET ASSEMBLY

Filed June 6, 1968     2 Sheets-Sheet 1

INVENTOR.
RUDOLF A. SPYRA
BY Bair, Freeman
& Molinare
ATTORNEYS

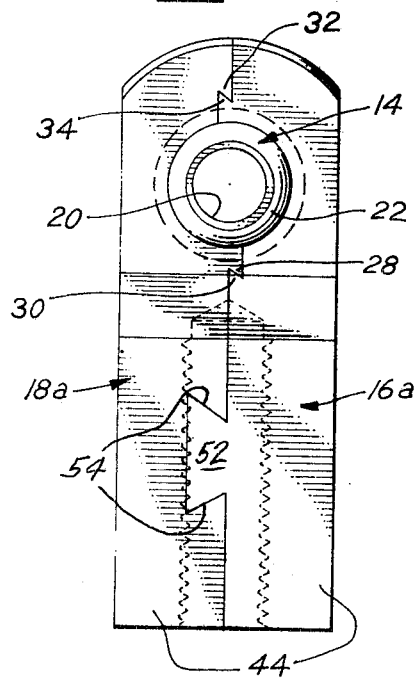
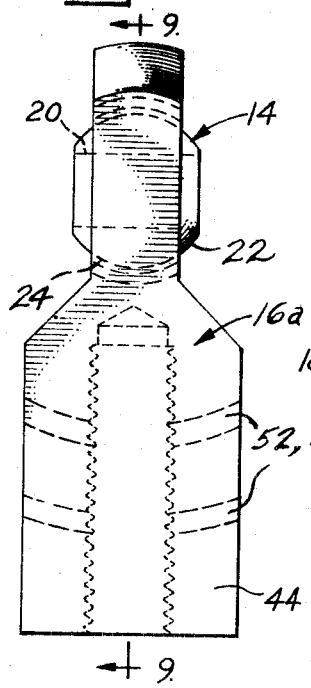
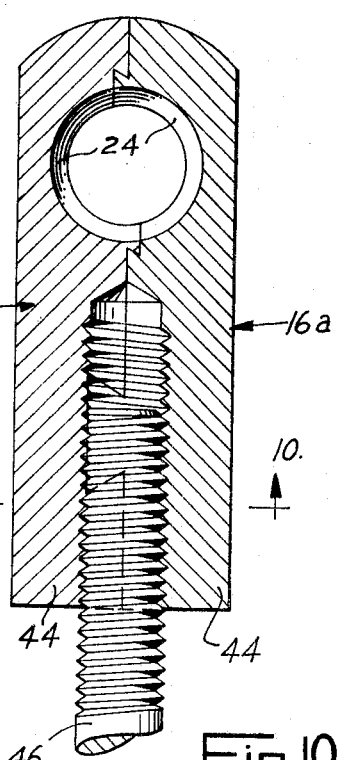
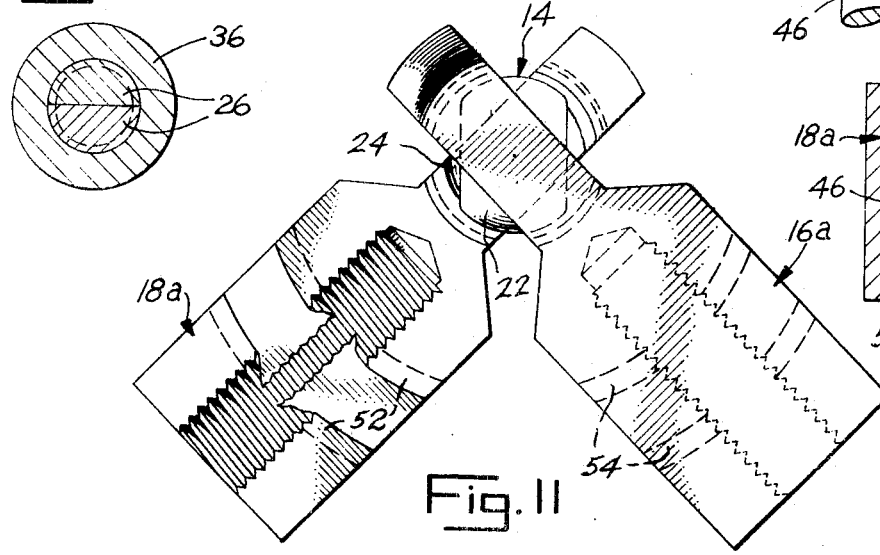
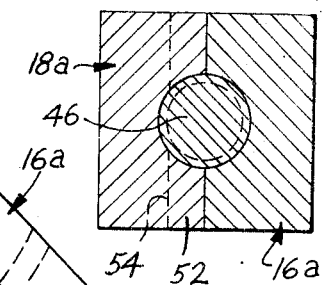
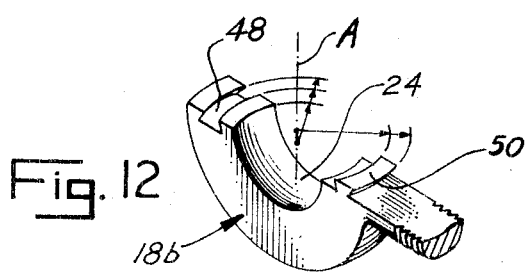
INVENTOR.
RUDOLF A. SPYRA
BY Bair, Freeman
& Molinare
ATTORNEYS

United States Patent Office 3,512,815
Patented May 19, 1970

3,512,815
BALL-AND-SOCKET ASSEMBLY
Rudolf A. Spyra, 5344 N. Paulina, Chicago, Ill. 60640
Filed June 6, 1968, Ser. No. 735,107
Int. Cl. F16c 11/06
U.S. Cl. 287—88                                      3 Claims

ABSTRACT OF THE DISCLOSURE

A ball-and-socket assembly comprising an outer housing member of two-part construction having a spherical inner surface formed in the two parts thereof, and an inner member having a spherical outer surface mating with the inner surface of the outer housing member. The outer housing member may be a male or female type of rod end or any other type of housing for the spherical inner member may have a bore to receive a shaft or rod, the entire assembly being usually termed a "spherical rod end bearing." The two parts of the outer housing member are connected together by mating dove-tail joints which are generated on a radius from an axis of the spherical surfaces whereby the two parts of the outer housing member may be crossed in relation to each other to receive the inner member, and then assembly may be accomplished by rotating the two parts to an aligned connected position wherein the dove-tails mate with each other. The two-part outer housing member may be partly in the form of a rod, which, when the two parts thereof are received in a sleeve or the like will be held assembled thereby, or the two parts may have a bore formed therein, which, upon reception of a rod therein effects retention of the two parts against disassembly. The dove-tail joints may assume a variety of configurations, but each generated about an axis of the spherical surfaces to accomplish the type of assembly described.

BACKGROUND OF THE INVENTION

Heretofore ball-and-socket assemblies and spherical rod end bearings have been in the form of inner bearings or the like and outer housing members with mating spherical surfaces, the various methods have been used to assemble the spherical bearings with respect to the housing members such as shown in Riebe Pat. No. 2,047,-885, Heim Pat. No. 2,400,506, McKloskey Pat. No. 3,-365,249 and Kuhn Pat. No. 3,377,681. My herein disclosed invention provides a much simpler and more accurate assembly.

One object of my present invention is to provide a simple means of rigidly and accurately connecting the two parts of a two-part outer housing member together comprising dove-tail connections between them wherein the inclined side edges of the dove-tail connections are generated on a radius from the center of the inner spherical surface thereof whereby the two parts of the outer member may assume an out-of-alignment position for receiving between their inner spherical surfaces a spherical inner member, and then rotated to an aligned position with their dove-tail connections mating with each other whereby the two parts are connected and assemble together with the spherical member between them and held by them against subsequent disassociation from the outer member.

Another object is to provide the two-part outer housing member with means for locking the two parts together upon the assembly therewith of a fourth member such as a sleeve or rod.

Still another object is to provide each part of the outer housing member with dove-tail joints that may be readily generated by rotary milling cutters or the like whose axes may be swung around the axis of the spherical surface of the part to thereby generate the dove-tail surfaces to the desired workable shape.

A further object is to provide a rod end incorporating a ball-and-socket bearing member wherein the two-part outer housing member is in the form of a threaded rod on which a sleeve may be threaded to lock the two parts thereof against disassembly after they have been assembled surrounding the spherical inner member.

Still a further object is to provide the two-part outer housing member in the form of a sleeve having a threaded bore into which a threaded rod may be screwed to retain the two parts thereof against disassembly after having been assembled to the spherical inner member.

BRIEF SUMMARY OF THE INVENTION

Two-part outer housing members are provided with a spherical inner surface formed in both to receive a spherical inner member which is retained because of the sphericity of the mating surfaces after assembly. Assembly is accomplished by the two parts of the outer housing member when out of alignment coacting with the spherical inner member, whereupon they may be rotated into alignment and will be locked together by dove-tail surfaces generated about the sphere axis, thereby permitting rotation of the two parts from non-aligned to aligned position for assembly, and reversely from aligned to non-aligned position for disassembly.

BRIEF DESCRIPTION OF THE DRAWINGS

FIG. 6 is a sectional view on the line 6—6 of FIG. 3.

FIG. 7 is a side elevation similar to FIG. 2 showing a female type of rod end bearing as distinguished from the male type shown in FIG. 2.

FIG. 8 is an edge view of FIG. 7.

FIG. 9 is a sectional view on the line 9—9 of FIG. 8 showing a rod threaded into a threaded bore of the rod end of FIGS. 7 and 8.

FIG. 10 is a sectional view on the line 10—10 of FIG. 9.

FIG. 11 is an edge view similar to FIG. 8 showing the two parts of the outer housing member out of alignment prior to assembly, assembly having been completed in FIG. 8.

FIG. 12 is a perspective view of a modification of FIG. 1 showing another possible type of dove-tail connection.

DESCRIPTION OF THE PREFERRED EMBODIMENTS

Figure 1:
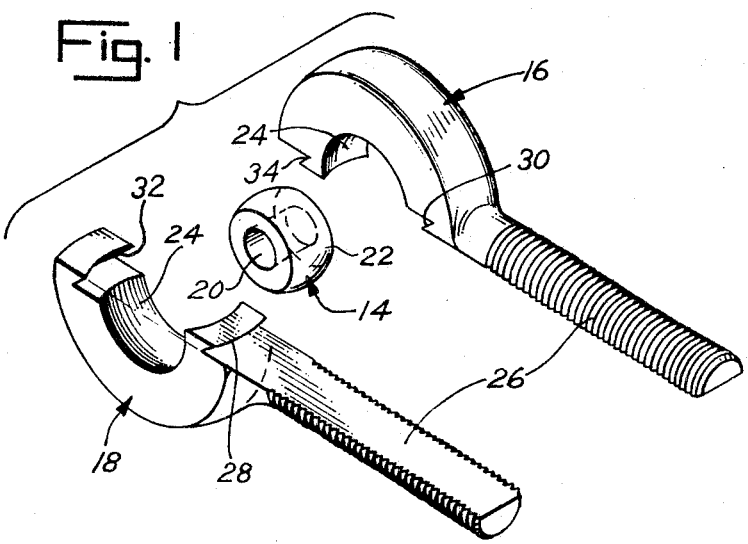
FIG. 1 is an exploded perspective view of a ball-and-socket assembly embodying my invention and showing it applied as a spherical rod end bearing.
Figure 2:
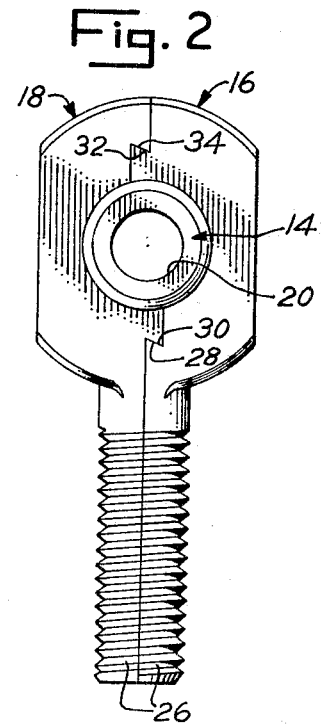
FIG. 2 is a side elevation of the ball-and-socket assembly of FIG. 1 after it has been assembled.

On the accompanying drawings I have used the reference numeral 14 to indicate in general a spherical inner bearing member and 16 to indicate one part of a two part outer housing member, the other part of which is indicated as 18. As shown in FIGS. 1 to 6, inclusive, and in FIG. 12, the two-part outer housing member may be in the form of a rod end wherein the rod part identified 26 is likewise in two parts and is threaded.

With reference to further constructional features of the parts 14, 16 and 18, the spherical inner member 14 may have a bore 20 for a shaft or rod, and may be bushed if found desirable in connection with certain bearing installations. The member 14 is provided with a spherical outer surface 22. The two-part outer housing member 16, 18 has a spherical inner surface 24 formed in the two parts thereof to fit the spherical outer surface 22.

Figure 4:
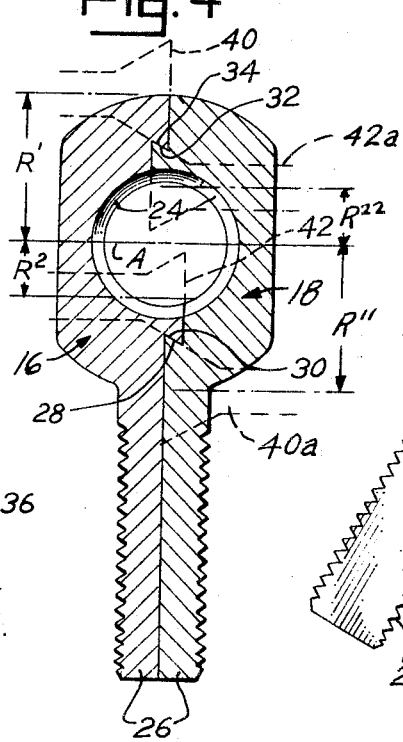
FIG. 4 is a sectional view on the line 4—4 of FIG. 3.
Figure 5:
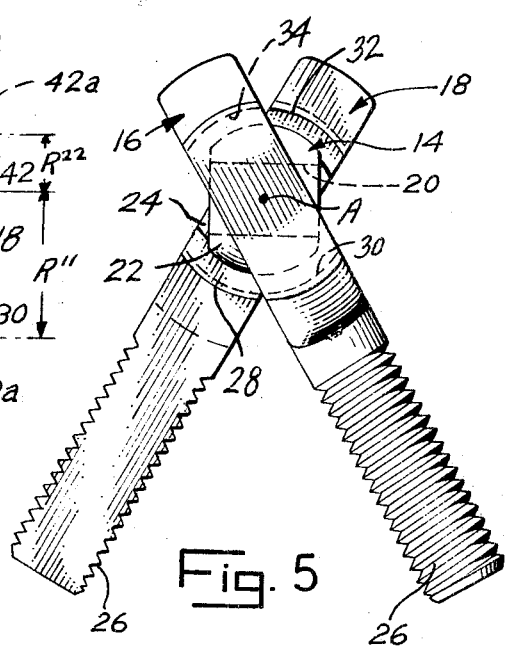
FIG. 5 is a view similar to FIG. 3 but showing the two parts of the rod end rotated out of alignment with each other prior to assembly, assembly having been completed in FIG. 3.

The two parts 16 and 18 are provided with a pair mating dove-tail shoulders 28, 30, and 32, 34 which, as illustrated in FIG. 5, are generated on an axis represented by a dot A and such axis is normal to the plane of the contacting flat surfaces of the threaded rod parts 26. This same axis is indicated by line A in FIG. 4 wherein dotted showings of milling cutters 40, 42, 40a and 42a are illustrated for cutting the dove-tail surfaces 34, 30, 28 and 32 respectively, generating them on the axis A according to radii $R^1$, $R^2$, $R^{11}$ and $R^{22}$. I have illustrated the milling cutters in FIG. 4 to disclose how it is possible to form the dove-tail surfaces in such manner that they are workable during assembly as will now be described. The parting surface between the two parts 16 and 18 is in a plane illustrated in FIG. 4 for instance as passing through the center of the spherical surfaces 22 and 24, but this is not a requirement. The plane referred to may be displaced from such center to suit requirements, and the various dove-tail surfaces may be appropriately arranged to project from or to be depressed into such plane as required for proper mating with each other.

Referring to FIG. 5, the outer housing member part 18 has the spherical bearing member 14 resting in the inner spherical inner surface 24 thereof, and the other part 16 is in position with its inner spherical surface resting on top of the bearing member. It will be noted that the parts 16 and 18 are angularly out of alignment with each other, but due to the interfitting of the spherical surfaces, the dove-tail surfaces of the two parts are in proper position to mate with each other upon rotation of the threaded rod ends 26 toward each other and into the final aligned position of FIG. 3 where the dove-tail surfaces interfit as illustrated in FIG. 4. It is now obvious that if the parts 16 and 18 are retained in this position the entire assembly of parts 14, 16 and 18 is such that the parts will not be subsequently disassociated from each other.

Figure 3:
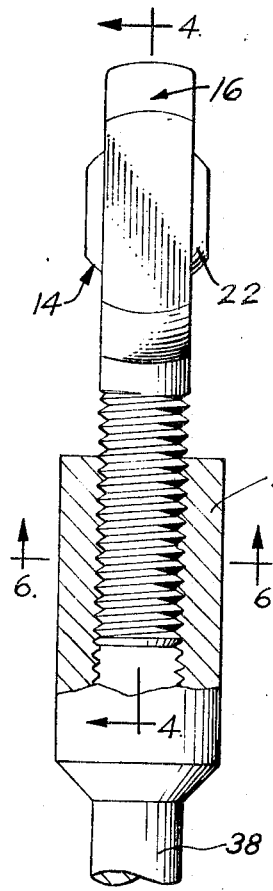
FIG. 3 is an edge view of FIG. 2 showing a sleeve threaded on the rod end.

With the male type of rod end illustrated in FIGS. 1 to 6 it is now merely necessary to confine the two half-rod ends 26 as by a sleeve 36 threaded thereon as in FIG. 6. FIG. 3 also illustrates the sleeve threaded thereon and as being formed on the end of a rod 38 as one example of use for my ball-and-socket bearing as herein disclosed. Alternatively the rod end 26 and the sleeve 36 may be devoid of threads, merely a smooth rod end in a bore or similar construction.

FIGS. 7 to 11 inclusive, illustrate the same basic invention with variations, one of which is a female type of outer housing member designated 16a, 18a, and constituting together a threaded sleeve 44 adapted to receive a threaded rod 46. Again the parts may be associated out of angular alignment as in FIG. 11 and then rotated to aligned position as in FIG. 8 to complete the assembly, after which the insertion of the threaded rod 46 keeps the parts assembled.

In addition to the dove-tail joints 28, 30, 32 and 34, the parts 16a and 18a may be provided with a male dove-tail projection 52 and a female dove-tail groove 54 coacting with each other for preventing the spreading apart of the two parts of the threaded sleeve 44.

From the foregoing disclosure it will be obvious that I have provided a simple arrangement for assembling the two parts of an outer housing member together in such manner that they surround and confine an inner spherical member due to coacting spherical surfaces of the inner and outer members upon a simple rotating movement of the two parts of the outer member from angularly non-aligned positions wherein they are firmly connected together by dove-tail surfaces. The dove-tail surfaces may be formed in a variety of configurations such as pairs of single surfaces shown in FIG. 1 or dove-tail tongues and grooves as shown in FIG. 12 wherein a female dove-tail joint 48 and a male dove-tail joint 50 are shown. Only one half the outer housing assembly is illustrated. The other half would of course be complementary as far as the tongues and grooves are concerned. FIG. 12 also illustrates radii of generation of the dove-tail surfaces in relation to the sphere axis A.

With respect to all variations of my ball-and-socket assembly disclosed, the prime requirement in each instance is the generation of the dove-tail surfaces on an axis of the coacting spherical surfaces.

I claim as my invention:

1. In a ball-and-socket assembly, an inner member having a spherical outer surface, and a two-part outer housing member having a spherical inner surface formed in the two parts thereof, said two parts of said outer housing member having mating dove-tail connection with each other wherein the dove-tail surfaces are generated about an axis passing through the center of said spherical surfaces, the two parts of said outer member forming male rod end, and a sleeve means associated with the two parts of said male rod end to hold them aligned and said dove-tail connection thereby against disassembly.

2. In a ball-and-socket assembly, an inner member having a spherical outer surface, and a two-part outer housing member having a spherical inner surface formed in the two parts thereof, said two parts of said outer housing member having mating dove-tail connection with each other wherein the dove-tail surfaces are generated about an axis passing through the center of said spherical surfaces, the two parts of said outer member forming a female rod end and the two parts of said female rod end being provided with a bore, and rod means associated with the two parts of said female rod end by being received in said bore thereof to hold them aligned and said dove-tail connection thereby against disassembly.

3. In a ball-and-socket assembly, an inner member having a spherical outer surface, and a two-part outer housing member having a spherical inner surface formed in the two parts thereof, said two parts of said outer housing member having mating dove-tail connection with each other wherein the dove-tail surfaces are generated about an axis passing through the center of said spherical surfaces, wherein plural dove-tail connections are provided, one of said dove-tail connections being formed about said spherical inner member and another of said dove-tail connections being formed in said two parts remote from spherical inner member.

References Cited

UNITED STATES PATENTS

| 1,807,373 | 5/1931 | Blunt. | |
| 2,047,885 | 7/1936 | Riebe. | |
| 2,077,582 | 4/1937 | Peo. | |
| 2,795,465 | 6/1957 | Dwyer | 308—72 |
| 2,895,769 | 7/1959 | Dwyer | 308—72 |
| 2,923,580 | 2/1960 | Dwyer. | |
| 3,365,249 | 1/1968 | McCloskey | 308—72 |
| 3,394,948 | 7/1968 | Rugen et al. | 287—88 |

FOREIGN PATENTS 721,576  6/1942  Germany.

DAVID J. WILLIAMOWSKY, Primary Examiner

A. V. KUNDRAT, Assistant Examiner

U.S. Cl. X.R.

29—149.5; 308—72